United States Patent [19]

Krummenacher

[11] Patent Number: 5,586,651

[45] Date of Patent: Dec. 24, 1996

[54] DISK HOLDER IN A CD BOX

[75] Inventor: Josef Krummenacher, Muri, Switzerland

[73] Assignee: Apparate-Und Werkzeugbau AG, Muri/AG, Switzerland

[21] Appl. No.: 502,217

[22] Filed: Jul. 13, 1995

[30] Foreign Application Priority Data

Jul. 14, 1994 [CH] Switzerland ............................ 02257/94

[51] Int. Cl.⁶ ...................................................... B65D 85/57
[52] U.S. Cl. ........................ 206/310; 206/308.1; 206/312
[58] Field of Search .............................. 206/308.1, 308.3, 206/307, 309–310, 312

[56] References Cited

U.S. PATENT DOCUMENTS

| | | | |
|---|---|---|---|
| 5,244,085 | 9/1993 | Lammerant et al. | 206/308.1 |
| 5,251,750 | 10/1993 | Gelardi et al. | 206/308.1 |
| 5,263,580 | 11/1993 | Ciba et al. | 206/308.1 |
| 5,366,073 | 11/1994 | Turrentine et al. | 206/308.1 |
| 5,377,825 | 1/1995 | Sykes et al. | 206/310 |
| 5,417,324 | 5/1995 | Joyce et al. | 206/308.1 |

FOREIGN PATENT DOCUMENTS

| | | |
|---|---|---|
| 0198083 | 10/1986 | European Pat. Off. . |
| 0429195 | 5/1991 | European Pat. Off. . |
| 3425579 | 1/1986 | Germany . |
| 9103114 | 7/1991 | Germany . |
| 4107218 | 9/1992 | Germany . |

*Primary Examiner*—Paul T. Sewell
*Assistant Examiner*—Luan K. Bui
*Attorney, Agent, or Firm*—Richard Linn

[57] ABSTRACT

The holder for the compact disk (2) comprises Z-shaped retaining tongues (3) having each a radial arm (4b) and an axial arm (5b). The external supporting surfaces (7) for the disk (2) are strongly undercut. Due to a supporting bead (8) which surrounds the ring of retaining tongues (3), the disk (2) is supported at a distance above the radial arms (4b). The retaining tongues are thus sufficiently elastic and have no sharp transitions, and no notching or shearing stresses are possible in the critical area. A safe retention without any risk of rupture is thus ensured.

4 Claims, 2 Drawing Sheets

DISK HOLDER IN A CD BOX

BACKGROUND OF THE INVENTION

The present invention refers to a disk holder in a CD box, comprising a ring of retaining tongues having each a radial arm followed at its inner end by a essentially axial arm which engages in the inserted disk in an elastic manner. Such boxes are generally formed of three parts, the flat center portion (tray) being provided with the proper disk holder. This tray has generally been manufactured from shock-resistant polystyrene, which is opaque and resilient, so that it will not break under high stresses such as when the box is dropped. However, it has recently been desired to manufacture the tray from clear, transparent polystyrene as well, so that the disk and the indications thereon are visible to the customer from both sides. However, clear standard polystyrene is very brittle, so that the conventional disk holder is inappropriate since it is not resilient and moreover has almost sharp edges. It has been found that such holders break at the edges in the drop test, whereby they become useless, of course. Moreover, in the drop test, the disks may be ejected from their holders even if the retaining tongues themselves are not damaged.

SUMMARY OF THE INVENTION

It is the object of the present invention to provide a holder made of clear polystyrene which eliminates these inconvenients. This object is attained by a disk holder in a CD box, wherein it is provided with a support outside the radial arms, respectively wherein the latter are shaped in such a manner that an inserted disk is supported at a distance above the radial arms, and wherein the external supporting surfaces of the axial arms are still overhanging when the disk is inserted.

BRIEF DESCRIPTION OF THE DRAWINGS

The invention is explained in more detail hereinafter with reference to the drawing.

DETAILED DESCRIPTION OF THE INVENTION

Figure 1:
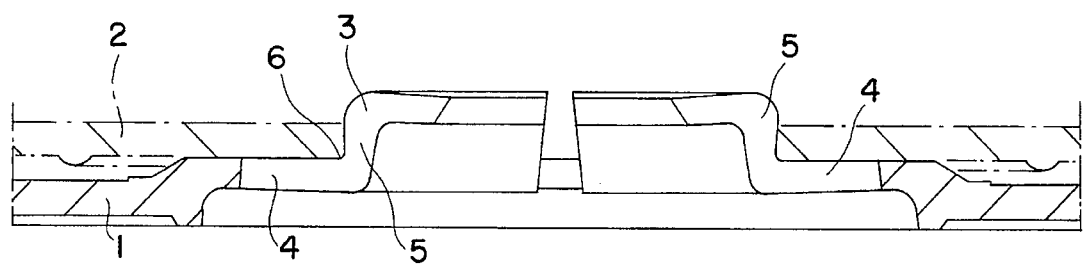
FIG. 1 shows a cross-section of the known embodiment.

FIG. 1 shows the known execution, only tray 1 with holder for the CD being represented. In order to retain disk 2, a ring of Z-shaped tongues 3 having each a radial arm 4 which is followed at its inner end by an essentially axial arm 5 is provided. The transition between the radial and the axial arms 4 and 5 substantially forms a sharp edge 6. Disk 2 rests directly on the tray and on the upper sides of radial arms 4 and engages in the sharp edge 6 between arms 4 and 5 of the retaining tongues substantially without play. If, as mentioned above, tray 1 and retaining tongues 3 are now made from clear, transparent polystyrene, which is particularly inelastic and brittle, there is a great risk that disk 2 will shear or break off the substantially inelastic retaining tongues at the transition between the radial and the axial arms in the drop test, whereby the holder is destroyed. There is an additional risk that disk 2 will be ejected from the holder because the external sides of arms 5, which support disk 2, are short and do not substantially project over the latter. If the retaining tongues are not broken in the plane of the disk by the impact anyway, they are inwardly deformed to such an extent that their external supporting surfaces are inwardly inclined, whereby the ejection of the disk from the retaining tongues is directly favored.

Figure 2:
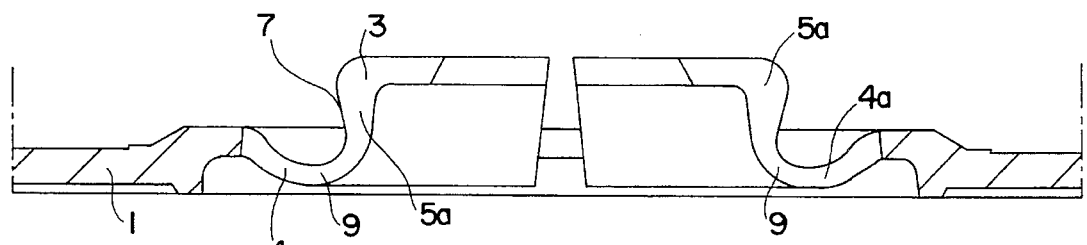
FIGS. 2 and 3 show a cross-section of a first embodiment of the invention, without and with an inserted compact disk, respectively.
Figure 3:
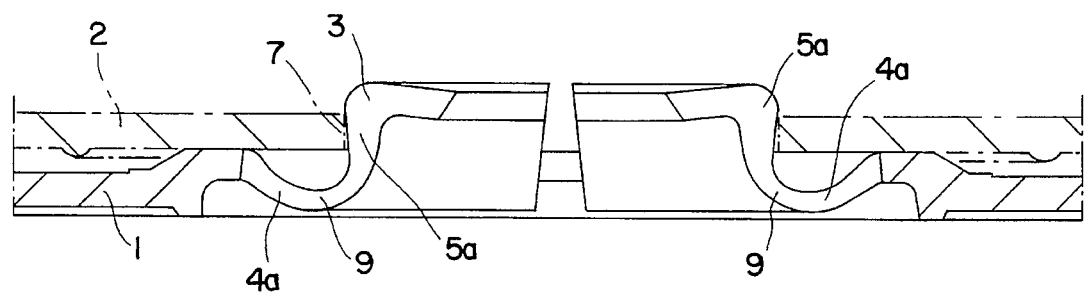

According to the invention, these inconvenients shall be eliminated. FIGS. 2 and 3 show a first embodiment in which corresponding parts are referenced as in FIG. 1. Radial arms 4a of the retaining tongues are curved downwards and are thus at a distance from disk 2. Axial arms 5a are correspondingly lengthened, and their external supporting surfaces 7 for disk 2 are strongly undercut, as appears particularly in FIG. 2. However, even when disk 2 is inserted according to FIG. 3, these supporting surfaces still considerably project from the latter. The elasticity of the retaining tongues is strongly increased by the fact that they are curved and substantially lengthened, and since the sharp lower and inner edge of disk 2 is no longer in contact with the undercut supporting surface 7 of the retaining tongues at all, no notching or shearing effect favoring a rupture of the retaining tongues takes place at this point even under high radial stresses. Conversely, edge 6 is replaced by a continuously curved transition 9. A destruction of the holder as well as an ejection of disk 2 under impacts are thus effectively prevented. Also, the increased elasticity of the retaining tongues makes it easier to insert and remove disk 2.

Figure 4:
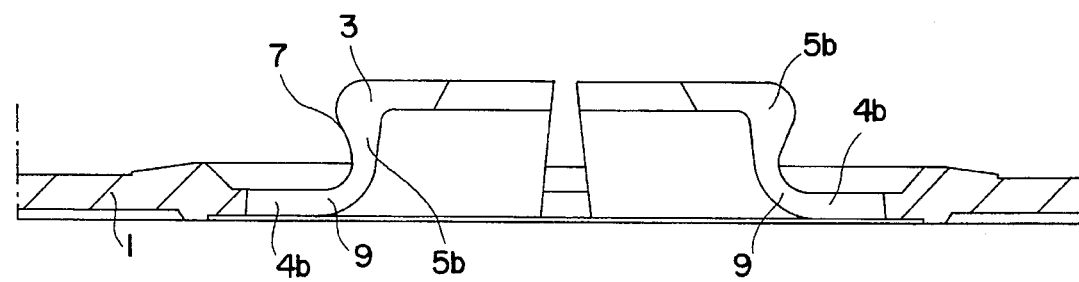
FIGS. 4 and 5 each show a cross-section of a second embodiment of the invention, without and with an inserted compact disk, respectively.
Figure 5:
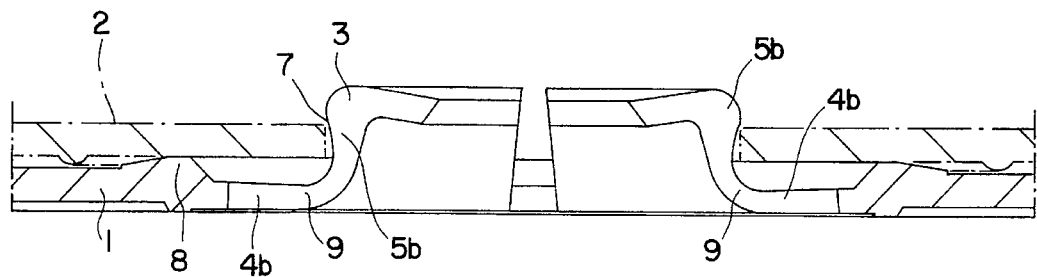

FIGS. 4 and 5 show a further embodiment in which corresponding elements are correspondingly designated. In this case, although the radial arms 4b of retaining tongues 3 are flat, the ring of retaining tongues is surrounded by an annular supporting bead 8 which according to FIG. 5 maintains the inserted CD at a distance above radial arms 4b of the retaining tongues. In this case as well, the external supporting surfaces of axial arms 5b are strongly undercut even when disk 2 is inserted according to FIG. 5. This results in the same advantages as in the embodiment of FIGS. 2 and 3, i.e. the elasticity of the retaining tongues between the point of contact of disk 2 and the outer connection of the retaining tongues is considerably increased, no notching and shearing stresses are possible in the critical area, and an ejection of the disk from the holder is effectively prevented even under high stresses.

Figure 6:
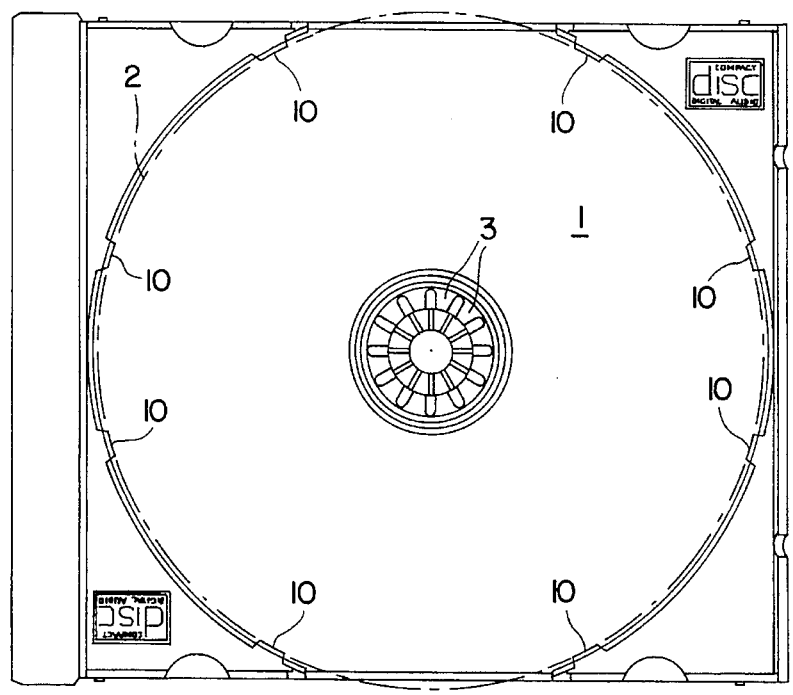
FIGS. 6 and 7 show a third embodiment of the invention.
Figure 7:
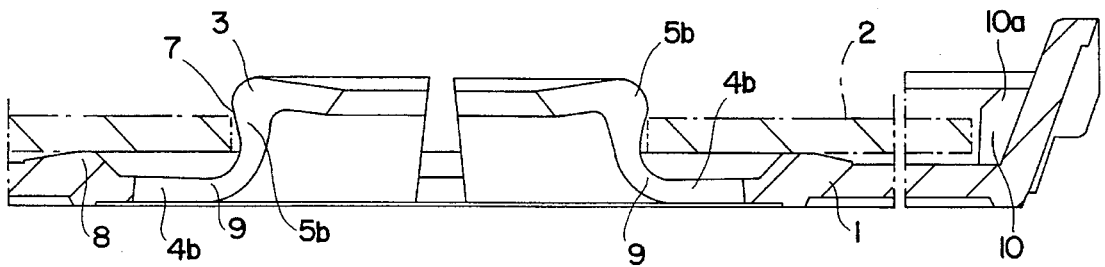

FIGS. 6 and 7 show an embodiment which corresponds to that of FIGS. 4 and 5 as far as the disk holder at the center of the box is concerned. FIG. 6 shows a plan view of the open box. As shown in this figure, groups of projections or ribs 10 are provided at the rim of the trough-shaped cavity for the disk which restrain the radial play of disk 2 and thus diminish the risk of a rupture of tongues 3 resp. of an ejection of the disk from its holder. This play may be comprised between 0.3 and 0.9 mm. The projections or ribs 10 have a chamfering 10a at the top which facilitates the insertion of disk 2.

I claim:

1. A disk holder in a CD box, comprising a ring of retaining tongues having each a radial arm followed at its inner end by a substantially axial arm which engages in the inserted disk in an elastic manner, wherein it is provided with a support outside the radial arms, respectively wherein the latter are shaped in such a manner that an inserted disk is supported at a distance above the radial arms, and wherein the external supporting surfaces of the axial arms are still overhanging when the disk is inserted, said radial arms having a curved portion radially extending underneath said inserted disk.

2. The holder of claim 1, wherein said support outside the radial arms is an annular supporting bead for a disk provided at the external end of the radial arms.

3. The holder of claim 1, wherein a circumference of a rim of a cavity of the box is provided with projections which limit the radial play of the disk in the box.

4. The holder of claim 3, wherein the projections have a chamfering which facilitates the insertion of the disk.

* * * * *